United States Patent [19]
Clarke et al.

[11] 3,901,892
[45] Aug. 26, 1975

[54] 1,3-ETHANOINDENO[2,1-C]-PYRIDINES AND 1,3-ETHANOBENZ[G]ISOQUINOLINES

[75] Inventors: Robert L. Clarke, Bethlehem; Sol J. Daum, Albany, both of N.Y.

[73] Assignee: Sterling Drug Inc., New York, N.Y.

[22] Filed: Dec. 14, 1973

[21] Appl. No.: 424,882

[52] U.S. Cl. ...... 260/283 R; 260/287 R; 260/289 R; 260/292; 260/999
[51] Int. Cl.² .................................... C07D 451/02
[58] Field of Search ........ 260/283 R, 287 R, 289 R, 260/293.54, 292

[56] References Cited
UNITED STATES PATENTS 3,462,443  8/1969  Paragamian et al. ............... 260/294
3,499,895  3/1970  Jucker et al. ..................... 260/247.5

*Primary Examiner*—G. Thomas Todd
*Attorney, Agent, or Firm*—Thomas L. Johnson; B. Woodrow Wyatt

[57] ABSTRACT

Compounds of the 1,3-ethanoindeno[2,1-c]pyridine and 1,3-ethanobenz[g]isoquinoline series, having local anesthetic and analgesic activity, are prepared by acid cyclization of 3-aryl or 3-arylmethyltropane-2-carboxylic acids or their esters.

30 Claims, No Drawings

1,3-ETHANOINDENO[2,1-c]-PYRIDINES AND 1,3-ETHANOBENZ[g]ISOQUINOLINES

This invention relates to novel compounds wherein a benzocycloalkane moiety is fused to the 2,3-position of a tropane nucleus. More particularly, the invention is concerned with compounds of the 1,3-ethanoindeno[2,1-c]pyridine and 1,3-ethanobenz[g]isoquinoline series and with methods for the preparation thereof.

The compounds of the invention are of the following formula:

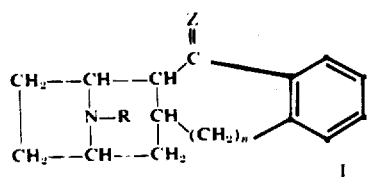

wherein:
R is hydrogen, lower-alkyl, lower-alkanoyl, lower-alkoxycarbonyl, cycloalkylcarbonyl, cycloalkyl-lower-alkyl, phenyl-lower-alkyl or hydroxy-lower-alkyl;
C=Z is C=O, $CH_2$, CH(OH) or CH(O-lower-alkanoyl);
$n$ is 0 or 1;
and the phenyl ring is unsubstituted or substituted by from one to two substituents selected from the group consisting of lower-alkyl, lower-alkoxy, fluoro, chloro and hydroxy.

Also contemplated by the invention are acid-addition salts of compounds of formula I.

For nomenclature purposes the following numbering systems for the ethanoindeno[2,1-c]pyridines (IA) and benz[g]isoquinolines (IB) within the scope of formula I are employed:

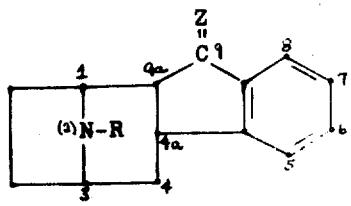

IA

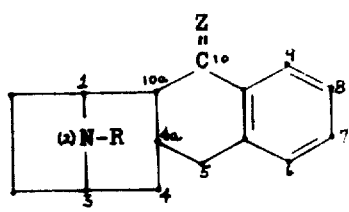

IB

Any stereochemical arrangement of the tropane nucleus and substituent groups is contemplated, although the configuration of the natural belladonna type alkaloids, atropine, cocaine, etc. is preferred. The compounds of the invention, if derived by synthesis from the natural sources will be optically active. However, optically inactive racemic mixtures can be obtained by total synthesis and these in turn can be resolved by conventional procedures to obtain both optical isomers, one being identical with the enantiomer obtained from natural sources and the other the "unnatural" enantiomer.

The term "lower-alkyl" in the above definitions of R and the phenyl substituents stands for alkyl having from one to six carbon atoms which may be straight or branched, preferably primary or secondary, thus including methyl, ethyl, propyl isopropyl, butyl, sec.-butyl, pentyl, hexyl and the like.

The term "lower-alkoxy" in the above definition of the phenyl substituents stands for alkoxy having from one to four carbon atoms which may be straight or branched, preferably primary or secondary, thus including methoxy, ethoxy, propoxy, isopropoxy, butoxy, secondary-butoxy, isobutoxy and tertiary-butoxy.

The term "lower-alkoxy" in the above definitions of R, C=Z and phenyl substituents stands for alkanoyl having from one to six carbon atoms which may be straight or branched, thus including formyl, acetyl, propionyl, butyryl, isobutyryl, valeryl, caproyl, and the like.

The term "cycloalkyl" in the above definition of R stands for cycloalkyl having from three to six ring members and a total carbon content of from three to ten carbon atoms, thus including cyclopropyl, cyclobutyl, cyclopentyl and cyclohexyl; and lower-alkylated derivatives thereof, e.g. 2-methylcyclopentyl, 4-butylcyclohexyl and the like.

The compounds of formula I wherein C=Z is C=O are prepared by cyclization of compounds of the formula:

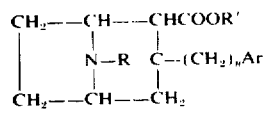

II wherein R and $n$ have the meanings given above, R' is hydrogen or lower-alkyl, and Ar is phenyl or phenyl substituted by from one to two substituents selected from the group consisting of lower-alkyl, lower-alkoxy, fluoro, chloro and hydroxy. The cyclization is effected by heating a compound of formula II with an acidic catalyst at a temperature between about 75°C. and 200°C. A preferred catalyst is polyphosphoric acid and a preferred temperature range is 100°–150°C.

The starting materials of formula II where R and R' are lower-alkyl and $n$ is 0 are prepared from an anhydroecgonine lower-alkyl ester and an Ar-magnesium halide as described in our copending application Ser. No. 306,918, filed Nov. 15, 1972, now U.S. Pat. No. 3,813,404. The compounds of the formula II where R' is hydrogen are prepared by hydrolysis of the esters (R' is lower-alkyl); and the compounds of formula II where R is other than lower-alkyl are prepared by chemical manipulations of the nitrogen substituent as described below. The compounds of formula II where $n$ is 1 are prepared analogously by reacting an anhydroecgonine lower-alkyl ester with an $ArCH_2$-magnesium halide.

Cyclization of the compounds of formula II where n is 0 provides compounds of the formula IA when the cyclopentanone ring is fused to the tropane nucleus in the cis manner, that isomer having the thermodynamically preferred configuration. In such a configuration, the carbonyl group at C-9a has an axial configuration and therefore should block quaternization of the nitrogen atom. In accordance with this prediction it was found that the compounds of formula IA where C=Z is C=O failed to react with ethyl iodide.

Cyclization of the compounds of formula II where n is 1 provides compounds of formula IB as a mixture of isomers where the cyclohexanone and tropane moieties are fused in the cis and trans manner [absolute configurations (natural) 1R,3S,4aS,10aS; and 1R,3S,4aS,10aR, respectively].

The compounds of formula I where C=Z is C=O can be converted to compounds where C=Z is CH(OH) and CH$_2$. Conversion of the ketones to the corresponding thioketals followed by desulfurization with Raney nickel affords the compounds where C=Z is CH$_2$. Reduction of the ketones with sodium borohydride produces epimeric mixtures of alcohols [C=Z is CH(O-H—$\beta$) and CH(OH—$\alpha$)]. Reduction of the ketones with diborane results in formation of mixtures of the epimeric alcohols [C=Z is CH(OH)] and methylene derivatives (C=Z is CH$_2$). The proportion of products in the mixture depends upon reaction conditions and nature of the aryl substituents. For example, the presence of a methoxy group in the 6- or 8-position of the compounds of formula IA activates the 9-position with the result that reduction of the carbonyl group at C-9 effects complete reduction to methylene (C=Z is CH$_2$) with no intermediate alcohols being detected. Reduction of the ketones with Adams platinum oxide catalyst affords mixtures of the epimeric alcohols [C=Z is CH(OH)].

The compounds of formula I where C=Z is CH(O-lower-alkanoyl) are prepared by conventional esterification reactions with the appropriate acid anhydride or acid halide.

When the alcohols of formula I [C=Z is CH(OH)] are heated with phosphorus oxychloride, dehydration takes place. In the indenopyridine series (formula IA) a double bond forms in the 9,9a-position which upon treatment with base rearranges to the 4a,9a-position. Hydrogenation of compounds of formula IA, wherein there is a double bond in the 9,9a-position with palladium-on-carbon affords compounds of formula IA wherein C=Z is CH$_2$ and having a cis-syn configuration, wherein the aromatic ring is on the same side of the molecule as the nitrogen atom. On the other hand, similar hydrogenation of compounds of formula IA wherein there is a double bond in the 4a,9a-position affords compounds of formula IA wherein C=Z is CH$_2$ and having a cis-anti configuration, wherein the aromatic ring is on the opposite side of the molecule from the nitrogen atom.

The compounds of formula I where the phenyl ring is substituted by hydroxy are readily prepared by acid cleavage, e.g. with hydrogen bromide, or the corresponding methoxy compounds. In fact, when compounds of formula II (R' = lower-alkyl) bearing a 4-methoxy group in the aromatic ring are treated with polyphosphoric acid at 150°C., ether cleavage occurs during the cyclization, giving the corresponding hydroxy compound of formula I. It is possible, however, to avoid ether cleavage during cyclization by using as a starting material the corresponding carboxylic acid of formula II (R'=H) which cyclizes at a lower temperature.

The compounds of formula I wherein R is hydrogen can be prepared from the compounds of formula I wherein R is methyl by demethylation procedures. The N-methyl compounds react with a lower-alkyl chlorocarbonate to form the corresponding urethane compounds wherein R is lower-alkoxycarbonyl. The latter undergo acid hydrolysis to give the compounds of formula I where R is hydrogen. Alternatively, the N-methyl compounds are treated with 2-chloroethyl chloroformate, followed by reacting the resulting N-(2-chloroethoxycarbonyl) compound with chromous perchlorate.

The compounds of formula I wherein R is hydrogen undergo various reactions to form N-substituted derivatives. Lower-alkanoic acid chlorides, cycloalkanecarboxylic acid chlorides, cycloalkane-lower-alkanoic acid chlorides, benzoyl chloride, or phenyl-lower-alkanoic acid chlorides react with the compounds of formula I wherein R is hydrogen to form the corresponding N-lower-alkanoyl, N-cycloalkylcarbonyl, N-cycloalkyl-lower-alkanoyl, N-benzoyl or N-phenyl-lower-alkanoyl compounds, respectively. The so-obtained amides can be reduced with lithium aluminum hydride to form N-lower-alkyl, N-cycloalkyl-lower-alkyl and N-phenyl-lower-alkyl compounds. The compounds of formula I wherein R is hydrogen also can be caused to react with a hydroxy-lower-alkyl halide under alkaline conditions to give compounds of formula I wherein R is hydroxy-lower-alkyl.

Pharmacological evaluation of the compounds of formula I has shown that they possess local anesthetic activity when tested by the standard intradermal anesthetic test in guinea pigs [Bulbring and Wajda, J. Pharmacol. Exptl. Therap. 85, 78 (1945)]. The compounds have an activity ranging from about 20 to about 100 percent that of cocaine. Furthermore, the compounds have been found to be active in the prevention of abdominal constriction in mice by acetylcholine [Collier et al., Brit. J. Pharmacol. Chemother. 32, 295 (1968)] or by phenyl-p-benzoquinone [Pearl et al., J. Pharmacol. Exptl. Therap. 154, 319 (1966)], which are standard tests indicative of analgesic activity.

The compounds of formula I which are secondary or tertiary amines and thus are basic in character are useful both in the free base form and in the form of acid-addition salts, and both forms are within the purview of the invention. The acid-addition salts are simply a more convenient form for use, and in practice use of the salt form inherently amounts to use of the base form. For pharmaceutical purposes, the acids which can be used to prepare the acid-addition salts include preferably those which produce, when combined with the free base, medicinally acceptable salts, that is, salts whose anions are relatively innocuous to the animal organism in medicinal doses of the salts, so that the beneficial properties inherent in the free base are not vitiated by side effects ascribable to the anions. Appropriate medicinally acceptable salts within the scope of the invention are those derived from mineral acids such as hydrochloric acid, hydrobromic acid, hydriodic acid, nitric acid, phosphoric acid, sulfamic acid, and sulfuric acid; and organic acids such as acetic acid, citric acid, tartaric acid, lactic acid, cyclohexanesulfamic acid, methanesulfonic acid, ethanesulfonic acid, benzenesulfonic acid, p-toluenesulfonic acid, quinic acid, and the like, giving the hydrochloride, hydrobromide, hydriodide, nitrate, phosphate, sulfamate, acetate, citrate, tartrate, lactate, cyclohexanesulfamate, methanesulfonate, ethanesulfonate, benzenesulfonate, p-toluenesulfonate and quinate, respectively.

The acid-addition salts of said basic compounds are prepared either by dissolving the free base in aqueous or aqueous-alcohol solution containing the appropriate acid and isolating the salt by evaporating the solution, or by reacting the free base and acid in an organic solvent, in which case the salt separates directly or can be obtained by concentration of the solution.

Although medicinally acceptable salts of said basic compounds are preferred for pharmaceutical purposes, all acid-addition salts are within the scope of our invention. All acid-addition salts are useful as sources of the free base form even if the particular salt per se is desired only as an intermediate product as for example when the salt is formed only for purposes of purification or identification, or when it is used as an intermediate in preparing a medicinally acceptable salt by ion exchange procedures.

The compounds can be prepared for use by dissolving under sterile conditions salt forms of the compounds in water (or an equivalent amount of non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like.

The molecular structures of the compounds of this invention were assigned on the basis of the methods of their synthesis and the study of their infrared and nuclear magnetic resonance (NMR) spectra, and confirmed by the correspondence between calculated and found values for the elementary analyses for representative examples.

The best modes of carrying out the preparative aspects of the invention are as follows:

EXAMPLE 1

(1R,3S,4aS,9aS)-1,2,3,4,4a,9a-Hexahydro-2-methyl-9H-1,3-ethanoindeno[2,1-c]pyridin-9-one [IA; C=Z is C=O, R is $CH_3$]

A 1:3 mixture of methyl (1R,2S,3S,5S)-3$\beta$-phenyl-1$\alpha$H,5$\alpha$H-tropane-2$\beta$-carboxylate and its 2$\alpha$-epimer, methyl (1R,2R,3S,5S)-3$\beta$-phenyl-1$\alpha$H,5$\alpha$H-tropane-2$\alpha$-carboxylate (370 g., 1.42 mol) was warmed to 100°C. and added all at once to 3.7 kg. (11 mol) of polyphosphoric acid at 100°C. with stirring. This mixture was stirred at 150°C. for 5 hours and poured onto a large volume of crushed ice. Concentrated ammonium hydroxide (5.4 kg.) was added with cooling and the alkaline mixture was extracted with methylene dichloride. The dried (sodium sulfate) extracts were concentrated to give an oily residue which was extracted with a total of 8 liters of pentane. Part of the pentane was distilled off and there precipitated 136 g. of (1R,3S,4aS,9aS)-1,2,3,4,4a,9a-hexahydro-2-methyl-9H-1,3-ethanoindeno[2,1-c]pyridin-9-one, m.p. 75°–78°C. The mother liquor residue in 500 ml. of methanol was added to a solution of 440 g. of sodium metabisulfite ($Na_2S_2O_5$) in 2.2 liters of water. Extraction of this solution with 6 × 500 ml. of methylene dichloride separated 31 g. (8%) of starting material. The aqueous solution together with some bisulfite adduct which had precipitated was treated with 560 g. of solid sodium bicarbonate. Water (200 ml.) and methylene dichloride (1.1 liters) were added and the mixture was heated under reflux for 5 hours. The methylene dichloride layer yielded a solid residue which was recrystallized from pentane, giving 85.2 g. more of (1R,3S,4aS,9aS)-1,2,3,4,4a,9a-hexahydro-2-methyl-9H-1,3-ethanoindeno[2,1-c]pyridin-9-one, m.p. 75°–78°C. [76% based on methyl (1R,2S,3S,5S)-3$\beta$-phenyl-1$\alpha$H,5$\alpha$H-tropane-2$\beta$-carboxylate consumed]. Further recrystallization gave a sample melting at 78°–79°C.; $[\alpha]_D^{25}$ = +13.4°.

The hydrochloride salt of (1R,3S,4aS,9aS)-1,2,3,4,4a,9a-hexahydro-2-methyl-9H-1,3-ethanoindeno[2,1-c]pyridin-9-one when recrystallized from acetonitrile showed polymorphism, m.p. 222°–224°C. and 259°C. (dec., evac. cap.); $[\alpha]_D^{25}$ = +39.8° (1% in $H_2O$).

(1R,3S,4aS,9aS)-1,2,3,4,4a,9a-Hexahydro-2-methyl-9H-1,3-ethanoindeno[2,1-c]pyridin-9-one failed to react with ethyl iodide in ether solution at room temperature. This observation is consistent with the absolute configuration assigned.

By replacement of the 3$\beta$-phenyl-1$\alpha$H,5$\alpha$H-tropane-2-carboxylate in the foregoing example by a molar equivalent amount of methyl 8-isopropyl 3$\beta$-phenyl-1$\alpha$H,5$\alpha$H-nortropane-2-carboxylate, methyl 3$\beta$-(p-chlorophenyl)-1$\alpha$H,5$\alpha$H-tropane-2-carboxylate, methyl 3$\beta$-(3,4-dimethoxyphenyl)-1$\alpha$H,5$\alpha$H-tropane-2-carboxylate, methyl 3$\beta$-(3-methoxy-4-chlorophenyl)-1$\alpha$H,5$\alpha$H-tropane-2-carboxylate, or methyl 3$\beta$-(4-methylphenyl)-1$\alpha$H,5$\alpha$H-tropane-2-carboxylate, there can be obtained, respectively, 1,2,3,4,4a,9a-hexahydro-2-isopropyl-9H-1,3-ethanoindeno[2,1-c]-pyridin-9-one [IA; C=Z is C=O, R is $CH(CH_3)_2$],
1,2,3,4,4a,9a-hexahydro-2-methyl-7-chloro-9H-1,3-ethanoindeno-[2,1-c]pyridin-9-one [IA; C=Z is C=O, R is $CH_3$, 7-Cl],
1,2,3,4,4a,9a-hexahydro-2-methyl-6,7-dimethoxy-9H-1,3-ethanoindeno[2,1-c]pyridin-9-one [IA; C=Z is C=O, R is $CH_3$, 6,7-$(OCH_3)_2$],
1,2,3,4,4a,9a-hexahydro-2-methyl-6-methoxy-7-chloro-9H-1,3-ethanoindeno[2,1-c]pyridin-9-one [IA; C=Z is C=O, R is $CH_3$, 6-$OCH_3$, 7-Cl],
or 1,2,3,4,4a,9a-hexahydro-2,7-dimethyl-9H-1,3-ethanoindeno[2,1-c]-pyridin-9-one [IA; C=Z is C=O, R is $CH_3$, 7-$CH_3$].

Treatment of 3$\beta$-phenyltropane-2$\beta$-carboxylic acid hydrochloride with polyphosphoric acid at 150°C. for 5 hours with work-up as in Example 1 gave a 73% yield of (1R,3S,4aS,9aS)-1,2,3,4,4a,9a-hexahydro-2-methyl-9H-1,3-ethanoindeno[2,1-c]-pyridin-9-one using preparative thin layer chromatography (tlc) (3:97 isopropylamine:ether) for purification. In the same manner, the 2$\alpha$-carboxylic acid gave the cyclized product in 57 percent yield.

EXAMPLE 2

(1S,3R,4aR,9aR)-1,2,3,4,4a,9a-Hexahydro-2-methyl-9H-1,3-ethanoindeno[2,1-c]pyridin-9-one (enantiomer of compound of Example 1) was prepared rom a 1:3 mixture of methyl (1S,2R,3R,5R)-3β-phenyl-1αH,5αH-tropane-2β-carboxylate and methyl 1S,2S,3R,5R)-3β-phenyl-1αH,5αH-tropane-2α-carboxylate according to the procedure of Example 1. The free base melted at 78°–80°C. (from n-pentane); $[\alpha]_D^{25} = -13.6°$, and the hydrochloride salt when crystallized from acetonitrile exhibited polymorphism, m.p. 118°–220°C. and 261°C. (dec.), $[\alpha]_D^{25} = -39.4°$ (1% in H₂O).

EXAMPLE 3

(1R,3S,4aS,9aS)-1,2,3,4,4a,9a-Hexahydro-2-methyl-7-fluoro-9H-1,3-ethanoindeno[2,1-c]pyridin-9-one [IA; C=Z is C=O, R is CH₃, 7-F] was prepared from methyl 3β-(p-fluorophenyl)-1αH,5αH-tropane-2α- and 2β-carboxylates and polyphosphoric acid according to the procedure of Example 1 and obtained in 70% yield; hydrochloride salt, m.p. 285°C. (dec.), massive prisms from acetonitrile; $[\alpha]_D^{25} = +36.2°$ (1% in H₂O).

EXAMPLE 4

(1R,3S,4aS,9aS)-1,2,3,4,4a,9a-Hexahydro-2-methyl-7-methoxy-9H-1,3-ethanoindeno[2,1-c]pyridin-9-one [IA; C=Z is C=O, R is CH₃, 7-OCH₃] was prepared from 3β-(p-methoxyphenyl)-1αH,5αH-tropane-2-carboxylic acid (in turn prepared from the corresponding methyl ester by 21-hr. reflux with 6 equivalents of 2N hydrochloric acid) and polyphosphoric acid heated on a steam bath for 4 hours. The product was dissolved in hot benzene, decolorized with activated charcoal, and crystallized upon cooling; yield 29%, colorless needles, m.p. 107°–108.5°C. (from hexane), $[\alpha]_D^{25} = -22.5°$ (1% in CHCl₃).

EXAMPLE 5

3β-(m-Methoxyphenyl)-1αH,5αH-tropane-2-carboxylic acid and polyphosphoric acid according to Example 4 gave a mixture of products which was chromatographed on 20 × 40 cm prep silica plates (0.25 g. per plate) using 3 solvent passes of isopropylamine-ether (3:97). The lead band afforded the free base of (1R,3S,4aS,9aS)-1,2,3,4,4a,9a-hexahydro-2-methyl-6-methoxy-9H-1,3-ethanoindeno[2,1-c]pyridin-9-one [IA; C=Z is C=O, R is CH₃, 6-OCH₃], m.p. 92.5°–94.5°C. in 43% yield; hydrochloride salt, m.p. 213°–215°C. (dec.), colorless massive prisms, $[\alpha]_D^{25} = +75.4°$ (1% in H₂O). A trailing band on the chromatograph afforded (1R,3S,4aS,9aS)-1,2,3,4,4a,9a-hexahydro-2-methyl-8-methoxy-9H-1,3-ethanoindeno-[2,1-c]pyridin-9-one [IA; C=Z is C=O, R is CH₃, 8-OCH₃] in 13 percent yield, free base, colorless needles from tetrahydrofuran, m.p. 143°–145°C.; $[\alpha]_D^{25} = -15.8°$ (1% CHCl₃).

EXAMPLE 6 a. Methyl (1R,2RS,3S,5S)-3β-benzyl-1αH,5αH-tropane-2α- and 2β-carboxylate [II; R and R' are CH₃, Ar is C₆H₅, n is 1].

Benzylmagnesium chloride was prepared from 112 g. (0.74 mol) of benzyl chloride and 26.8 g. (1.1 g. atom) of magnesium turnings in 750 ml. of ether and chilled to −20°C. A solution of 72.0 g. (0.40 mol) of (−)-anhydroecgonine methyl ester in 375 ml. of ether was added with stirring at −20° to −25°C. over a 30 minute period, and the mixture was stirred at this temperature for 15 minutes. Ice and water (about 200 ml.) were added followed by 2N hydrochloric acid to acidity and dissolution of all solid. The layers were separated and the water layer washed with ether. The water layer was made basic with concentrated ammonium hydroxide and extracted 4 times with ether. The dried sodium sulfate extracts were concentrated and the residual oil (86.7 g.) was distilled, the product being collected at 143°–152°C. (0.8 to 0.6 mm.), 36.7 g. (34%), $n_D^{25} = 1.5317$.

By replacing the benzyl chloride in the foregoing preparation by a molar equivalent amount of p-fluorobenzyl chloride, p-chlorobenzyl bromide, p-methoxybenzyl chloride or p-methylbenzyl chloride, there can be obtained, respectively, methyl (1R,2RS,3S,5S)-3β-(p-fluorobenzyl)-1αH,5αH-tropane-2-carboxylate, methyl (1R,2RS,3S,5S)-3β-(p-chlorobenzyl)-1αH,5αH-tropane-2-carboxylate, methyl (1R,2RS,3S,5S)-3β-(p-methoxybenzyl)-1αH,5αH-tropane-2-carboxylate, or methyl (1R,2RS,3S,5S)-3β-(p-methylbenzyl)-1αH,5αH-tropane-2-carboxylate.

b. (1R,3S,4aR,10aR)-1,3,4,4a,5,10a-Hexahydro-2-methyl-1,3-ethanobenz[g]isoquinolin-10(2H)-one [IB; C=Z is C=O, R is CH₃] was prepared from 8.4 g. (0.031 mol) of the product of part (a) above and 58 ml. of polyphosphoric acid at 150°C. for 5 hours. The oily product was distilled to give 4.5 g. of (1R,3S,4aR,10a-R)-1,3,4,4a,5,10a-hexahydro-2-methyl-1,3-ethanobenz[g]isoquinolin-10(2H)-one as an amber oil, b.p. 136°–146°C. (0.15-0.2 mm.), $n_D^{25} = 1.5744$; hydrochloride salt, m.p. 239°–240°C. (colorless prisms from acetone), $[\alpha]_D^{25} = -11.7°$ (1% in H₂O).

By replacing the methyl (1R,2RS,3S,5S)-3β-benzyl-1αH,5αH-tropane-2-carboxylate in the foregoing preparation by a molar equivalent S) of methyl (1R,2RS, 3S,5S)-3β-(p-fluorobenzyl)-1αH,5αH-tropane-2-carboxylate, methyl (1R,2RS,3S,5S)-3β(p-chlorobenzyl)-1αH,5αH-tropane-2-carboxylate, methyl (1R,2RS,3S,5S)-3β-(p-methoxybenzyl)-1αH,5αH-tropane-2-carboxylate, or methyl (1R,2RS,3S,5S)-3β-(p-methylbenzyl)-1αH,5αH-tropane-2-carboxylate, there can be obtained, respectively, (1R,3S,4aR,10aR)-1,3,4,4a,5,10a-hexahydro-2-methyl-8-fluoro-1,3-ethanobenz[g]isoquinoline-10(2H)-one [IB; C=Z is C=O, R is CH₃, 8-F],
(1R,3S,4aR,10aR)-1,3,4,4a,5,10a-hexahydro-2-methyl-8-chloro-1,3-ethanobenz[g]isoquinolin-10(2H)-one [IB; C=Z is C=O, R is CH₃, 8-Cl],
(1R,3S,4aR,10aR)-1,3,4,4a,5,10a-hexahydro-2-methyl-8-methoxy-1,3-ethanobenz[g]isoquinolin-10(2H)-one [IB; C=Z is C=O, R is CH₃, 8-OCH₃], or
(1R,3S,4aR,10aR)-1,3,4,4a,5,10a-hexahydro-2,8-dimethyl-1,3-ethanobenz[g]isoquinolin-10(2H)-one [IB; C=Z is C=O, R is CH₃, 8-CH₃].

EXAMPLE 7

(1R,3S,4aS,9aS)-1,2,3,4,4a,9a-Hexahydro-2-methyl-9H-1,3-ethanoindeno[2,1-c]pyridine [IA; C=Z is CH₂, R is CH₃].

A solution of 9.35 g. (0.040 mol) of ketone (1R,3S,4-aS,9aS)-1,2,3,4,4a,9a-hexahydro-2-methyl-9H-1,3-ethanoindeno-[2,1-c]pyridin-9-one in 250 ml. of acetic acid was treated with 20 ml. of ethanedithiol and 20 ml. of boron trifluoride-etherate. The next day the precipitate was separated, ether was added to the filtrate and more solid was collected. The solid residues were washed with fresh ether and then dissolved in water.

Dilute sodium hydroxide (2N) was added and the free base was separated with ether. Crystallization from pentane gave 6.7 g. (55%) of (1R,3S,4aS,9aS)-9,9-ethylenedithio-1,2,3,4,4a,9a-hexahydro-2-methyl-9H-1,3-ethanoindeno[2,1-c]pyridine, m.p. 102°–103°C.

Without further purification this product was dissolved in 350 ml. of 95% ethanol and refluxed for 12 hours in the presence of 12 teaspoonfuls of Raney nickel. Removal of catalyst and solvent gave 3.4 g. of crude product. A portion (0.5 g.) was chromatographed on silica prep plates (ether-pentane-isopropylamine, 50:47:3) to give pure (1R,3S,4aS,9aS)-1,2,3,4,4a,9a-hexahydro-2-methyl-9H-1,3-ethanoindeno[2,1-c]pyridine as an oil.

The remainder of the crude product was converted to the hydrochloride salt, 2.4 g., m.p. 301°C. (dec.) from acetone, $[\alpha]_D^{25} = +93.5°$ (1% in $H_2O$); total yield 51% from thioketal.

By the same procedure, 1,2,3,4,4a,9a-hexahydro-2-isopropyl-9H-1,3-ethanoindeno[2,1-c]pyridin-9-one 1,2,3,4,4a,9a-hexahydro-2-methyl-7-chloro-9H-1,3-ethanoindeno[2,1-c]pyridin-9-one, 1,2,3,4,4a,9a-hexahydro-2-methyl-6,7-dimethoxy-9H-1,3-ethanoindeno[2,1-c]pyridin-9-one, 1,2,3,4,4a,9a-hexahydro-2-methyl-6-methoxy-7-chloro-9H-1,3-ethanoindeno[2,1-c]pyridin-9-one, or 1,2,3,4,4a,9a-hexahydro-2,7-dimethyl-9H-1,3-ethanoindeno[2,1-c]-pyridin-9-one can be reduced, respectively, to produce 1,2,3,4,4a,9a-hexahydro-2-isopropyl-9H-1,3-ethanoindeno[2,1-c]-pyridine [IA; C=Z is $CH_2$, R is $CH(CH_3)_2$], 1,2,3,4,4a,9a-hexahydro-2-methyl-7-chloro-9H-1,3-ethanoindeno[2,1-c]pyridine [IA; C=Z is $CH_2$, R is $CH_3$, 7-Cl], 1,2,3,4,4a,9a-hexahydro-2-methyl-6,7-diimethoxy-9H-1,3-ethanoindeno[2,1-c]pyridine [IA; C=Z is $CH_2$, R is $CH_3$, 6,7-$(OCH_3)_2$], 1,2,3,4,4a,9a-hexahydro-2-methyl-6-methoxy-7-chloro-9H-1,3-ethanoindeno[2,1-c]pyridine [IA; C=Z is $CH_2$, R is $CH_3$, 6-$OCH_3$, 7-Cl], or 1,2,3,4,4a,9a-hexahydro-2,7-dimethyl-9H-1,3-ethanoindeno[2,1-c]-pyridine [IA; C=Z is $CH_2$, R is $CH_3$, 7-$CH_3$].

EXAMPLE 8

(1S,3R,4aR,9aR)-1,2,3,4,4a,9a-Hexahydro-2-methyl-9H-1,3-ethanoindeno[2,1-c]pyridine [IA; C=Z is $CH_2$, R is $CH_3$, enantiomer of compound of Example 7] was prepared from (1S,3R,4aR,9aR)-1,2,3,4,4a,9a-hexahydro-2-methyl-9H-1,3-ethanoindeno[2,1-c]-pyridin-9-one (Example 2) by thioketalization and reduction with Raney nickel according to the procedure of Example 7. It was obtained in the form of its hydrochloride salt, m.p. 298°C. (dec.), $[\alpha]_D^{25} = -95.8°$ (1% in $H_2O$).

EXAMPLE 9

(1R,3S,4aS,9aS)-1,2,3,4,4a9a-Hexahydro-2-methyl-9H-1,3-ethanoindeno[2,1-c]pyridin-9-ol [IA; C=Z is CH(OH), R is $CH_3$].

A solution of 3.13 g. (13 mmol) of (1R,3S,4aS,9aS)-1,2,3,4,4a,9a-hexahydro-2-methyl-9H-1,3-ethanoindeno[2,1-c]- pyridin-9-one in 50 ml. of ethanol was treated with 1.5 g. (40 mmol) of sodium borohydride in 5 ml. of water. The mixture was kept at room temperature for 72 hours, then treated with acetone and more water and ether added. The ether layer was dried (anhydrous sodium sulfate) and concentrated to afford a mixture of isomeric alcohols. The latter was subjected to plate chromatography (3:97 isopropylamine-ether; 11 plates; 2 solvent passes) to give 1.8 g. of (1R,3S,4aS,9aS,9S)-1,2,3,4,4a,9a-hexahydro-2-methyl-9H-1,3-ethanoindeon[2,1-c]pyridin-9α-ol, m.p. 98°–100°C.; hydrochloride salt, m.p. 285°–287°C. (dec.) (from acetonitrile), $[\alpha]_D^{25} = ]+62.9°$ (1% in $H_2O$); and 0.25 g. of (1R,3S,4aS,9aS,9R)-1,2,3,4,4a,9a-hexahydro-2-methyl-9H-1,3-ethanoindeno[2,1-c]pyridin-9β-ol, m.p. 140°–142°C.; hydrochloride salt, m.p. 230°–231°C. (dec.) (from acetone), $[\alpha]_D^{25} = +74.1°$ (1% in $H_2O$).

By the same procedure, 1,2,3,4,4a,9a-hexahydro-2-isopropyl-9H-1,3-ethanoindeno[2,1-c]pyridin-9-one, 1,2,3,4,4a,9a-hexahydro-2-methyl-7-chloro-9H-1,3-ethanoindeno[2,1-c]pyridin-9-one, 1,2,3,4,4a,9a-hexahydro-2-methyl-6,7-dimethoxy-9H-1,3-ethanoindeno[2,1-c]pyridin-9-one, 1,2,3,4,4a,9a-hexahydro-2-methyl-6-methoxy-7-chloro-9H-1,3-ethanoindeno[2,1-c]pyridin-9-one, or 1,2,3,4,4a,9a-hexahydro-2,7-dimethyl-9H-1,3-ethanoindeno[2,1-c]pyridin-9-one can be reduced with sodium borohydride to produce, respectively, 1,2,3,4,4a,9a-hexahydro-2-isopropyl-9H-1,3-ethanoindeno[2,1-c]pyridin-9-ol [IA; C=Z is CH(OH), R is $CH(CH_3)_2$], 1,2,3,4,4a,9a-hexahydro-2-methyl-7-chloro-9H-1,3-ethanoindeno[2,1-c]pyridin-9-ol [IA; C=Z is CH(OH), R is $CH_3$, 7-Cl], 1,2,3,4,4a,9a-hexahydro-2-methyl-6,7-dimethoxy-9H-1,3-ethanoindeno[2,1-c]pyridin-9-ol [IA; C=Z is CH(OH), R is $CH_3$, 6,7-$(OCH_3)_2$], 1,2,3,4,4a,9a-hexahydro-2-methyl-6-methoxy-7-chloro-9H-1,3-ethanoindeno[2,1-c]pyridin-9-ol [IA; C=Z is CH(OH), R is $CH_3$, 6-$OCH_3$, 7-Cl], or 1,2,3,4,4a,9a-hexahydro-2,7-dimethyl-9H-ethanoindeno[2,1-c]pyridin-9-ol [IA; C=Z is CH(OH), R is $CH_3$, 7-$CH_3$].

EXAMPLE 10

(1R,3S,4aS,9R,9aS)-1,2,3,4,4a,9a-Hexahydro-2-methyl-9H-1,3-ethanoindeno[2,1-c]pyridin-9β-ol Acetate [IA; C=Z is CH($OCOCH_3$), R is $CH_3$].

(1R,3S,4aS,9R,9aS)-1,2,3,4,4a,9a-Hexahydro-2-methyl-9H-1,3-ethanoindeno[2,1-c]pyridin-9β-ol (Example 9, 10 g., 4 mmol) was treated with 50 ml. of pyridine and 40 ml. of acetic anhydride for 24 hours at room temperature. The resulting acetate-ester was isolated in the form of its methanesulfonate salt (9.48 g.) which when recrystallized from acetone had the m.p. 214°–215°C., $[\alpha]_D^{25} = +197.2°$ (1% in $H_2O$).

By replacing the acetic anhydride in the foreging preparation by an acetic anhydride-formic acid mixture, butyric anhydride, isobutyric anhydride or caproyl chloride, there can be obtained the corresponding formate, butyrate, isobutyrate or caproate esters of (1R,3S,4aS,9R,9aS)-1,2,3,4,4a,9a-hexahydro-2-methyl-9H-1,3-ethanoindeno[2,1-c]pyridin-9β-ol.

EXAMPLE 11

Diborane Reductions a. A solution of 80 g. (0.38 mol) of (1R,3S,4aS,9aS)-1,2,3,4,4a,9a-hexahydro-2-methyl-9H-1,3-ethanoindeno[2,1-c]pyridin-9-one in 1.0 liters of tetrahydrofuran was added in 1.5 hours to 1.8 liters of 1M diborane in tetrahydrofuran with stirring under nitrogen and cooling by ice. The solution was heated under reflux for 24 hours, and then allowed to stand at room temperature for 66 hours. Water (160 ml.) was added dropwise followed by 800 ml. of 2N sodium hydroxide. Most of the tetrahydrofuran was boiled away over a 2.5 hour period. Ether was added and the layers were separated. The ether solution was dried (sodium sulfate) and concentrated to afford 89.4 g. of an oily residue that partially crystallized from pentane. The solid was digested with ether to afford 37.3 g. of (1R,3S,4aS,9aS-9R)-1,2,3,4,4a,9a-hexahydro-2-methyl-9H-1,3-ethanoindeno[2,1-c]-pyridin-9β-ol, m.p. 138°–140°C. The combined mother liquors were distilled at 1 mm. The fraction boiling at 116–126°C. (29.9 g., 40%) was almost pure (1R,3S,4aS,9 aS)-1,2,3,4,4a,9a-hexahydro-2-methyl-9H-1,3-ethanoindeno[2,1-c]pyridine, $n_D^{28}$ = 1.5562. The pot residue crystallized and afforded another 2.4 g. of β-alcohol, m.p. 139°–142°C. (54 percent yield). The mother liquor obtained from this solid (5.1 g.) appeared to be a 1:1 mixture of α-alcohol (3 percent yield) and β-alcohol by tlc analysis.

b. By Inverse Addition

A solution of 1850 ml. of 1M diborane in tetrahydrofuran was added over 0.5 hour to 80 g. (0.38 mol) of 1R,3S,4aS,9aS)-1,2,3,4,4a,9a-hexahydro-2-methyl-9H-1,3-ethanoindeno[2,1-c]pyridin-9-one in 940 ml. of tetrahydrofuran with stirring under nitrogen at room temperature. The solution was then heated under reflux for 24 hours, and then allowed to stand at room temperature for another 66 hours. The mixture was worked up as in the preceding experiment, affording 93.1 g. of oily residue. Distillation at 0.7 mm. and collection of the fraction that boiled at 110–123°C. gave 54.9 g. (73%) of almost pure (1R,3S,4aS, 9aS)-,2,3,4,4a,9a-hexahydro-2-methyl-9H-1,3-ethanoindeno[2,1-c]pyridine. A fraction that boiled at 23°–140°C. solidified, giving 11.7 g. of (1R,3S,4aS,9a-5,9R)-1,2,3,4,4a,9a-hexahydro-2-methyl-9H-1,3-ethanoindeno[2,1-c]pyridin-9β-ol, m.p. 140°–142°C. The pot residue afforded another 6.9 g. of the latter β-alcohol, m.p. 138-140°C. (23%).

c. Diborane Reduction of a Mixture of α-Alcohol and β-Alcohol

A solution of 9.6 g. of mother liquor from an experiment like the above under part (a) containing an equal mixture of (1R,3S,4aS,9aS)-1,2,3,4,4a,9a-hexahydro-2-methyl-9H-1,3-ethanoindeno[2,1-c]pyridin-9β-ol and -9α-ol in 160 ml. of tetrahydrofuran was added to 250 ml. of 1M diborane in tetrahydrofuran at ice bath temperature. Distillation of the crude product gave 3.6 g. of (1R,3S,4aS,9aS)-1,2,3,4,4a,9a-hexahydro-2-methyl-9H-1,3-ethanoindeno[2,1-c]pyridine, b.p. 115°–130°C. (0.7 mm.). The pot residue crystallized and afforded 1.8 g. of β-alcohol, m.p. 138°–140°C.

EXAMPLE 12

Diborane reduction of (1S,3R,4aR,9aR)-,2,3,4,4a,9a-hexahydro-2-methyl-9H-1,3-ethanoindeno[2,1-c]pyridin-9-one (Example 2) according to the procedure of Example 11 (ketone added to diborane), afforded (1S,3R,4aR,9aR)-1,2,3,4,4a,9a-hexahydro-2-methyl-9H-1,3-ethanoindeno[2,1-c]pyridine, b.p. 120°–134°C. (1-1.5 mm.), $n_D^{27}$ = 1.5552; hydrochloride salt, m.p. 298°C. (dec.), $[\alpha]_D^{25}$ = –93.0° (1% in H₂O), identical with the compound obtained in Example 8; and (1S,3R,4aR,9S,9aR)-1,2,3,4,4a,9a-hexahydro-2-methyl-9H-1,3-ethanoindeon[2,1-c]pyridin-9β-ol, m.p. 138°–140°C.; hydrochloride salt, m.p. 220°C. (dec.), $[\alpha]_D^{25}$ = –74.7° (1% in water), the enantiomer of the 9β-ol compound of Example 9.

In a similar experiment that was heated under reflux for only three hours, there was also obtained after chromatography some of the isomeric (1S,3R,4aR,9R,9aR-)-1,2,3,4,4a,9a-hexahydro-2-methyl-9H-1,3-ethanoindeno[2,1-c]pyridin-9α-ol, hydrochloride salt, m.p. 282°C.(dec.), $[\alpha]_D^{25}$ = –62.6° (1% in H₂O), the enantiomer of the 9α-ol compound of Example 9.

A mixture of the enantiomeric 9α- and 9β-alcohols was also prepared by hydrogenation of a solution of 0.59 g. (2.6 mmols) of (1S,3R,4aR,9aR)-1,2,3,4,4a,9a-hexahydro-2-methyl-9H-1,3-ethanoindeno[2,1-c]pyridin-9-one (Example 2) in 300 ml. of 95% ethanol containing 0.25 g. of platinum oxide catalyst (pressure 3.5 kg/cm²). The catalyst and solvent were removed to give 0.59 g. of an epimeric mixture of alcohols which was separated by plate chromatography (97:3 ether-isopropylamine). The less polar band afforded 150 mg. (25%) of 3β-ol compound, m.p. 128°–135°C.; and the more polar band gave 290 mg. (49%) of 3α-ol compound, m.p. 99°–100°C.

EXAMPLE 13

Diborane reduction of (1R,3S,4aS,9aS)-1,2,3,4,4a,9a-hexahydro-2-methyl-7-fluoro-9H-1,3-ethanoindeno[2,1-c]pyridin-9-one Example 3) by the method described in Example 11, and distillation of the crude mixture gave (1R,3S,4aS,9aS)-1,2,3,4,4a,9a-hexahydro-2-methyl-7-fluoro-9H-1,3-ethanoindeno-[2,1-c]pyridine [IA; R is CH₃, C=Z is CH₂, 7F], b.p. 125°–130°C. (0.7 mm.) m.p. 51°–54.5°C.; hydrochloride salt, m.p. 291°C. (dec.) (from acetonitrile), $[\alpha]_D^{25}$ = +83.4° (1% in H₂O) (74 percent yield); and (1R,3S,-4aS,9R,9aS)-1,2,3,4,4a,9a-hexahydro-2-methyl-7-fluoro-9H-1,3-ethanoindeno[2,1-c]pyridin-9β-ol [IA; R is CH₃, C=Z is CH(OH), 7F], b.p. 130°–147°C. (0.7 mm.) m.p. 114°–115°C. (from ether); hydrochloride salt, m.p. 268°–270°C. (dec.), $[\alpha]_D^{25}$ = +83.4° (1% in H₂O) (26 percent yield).

EXAMPLE 14

(1R,3S,4aS,9R,9aS)-1,2,3,4,4a,9a-Hexahydro-2-methyl-7-fluoro-9H-1,3-ethanoindeno[2,1-c]pyridin-9β-ol Acetate [IA: R is CH₃, C=Z is CH(OCOCH₃), 7F] was prepared by acetylation of the 9β-ol compound of Example 13 according to the procedure of Example 10, and was obtained in 86 percent yield, m.p. 128°–129°C. (from pentane), $[\alpha]_D^{25}$ = +59.3° (1% in CHCl₃).

EXAMPLE 15

Diborane reduction of (1R,3S,4aS,9aS)-1,2,3,4,4a,9a-hexahydro-2-methyl-7-methoxy-9H-1,3-ethanoindeno[2,1-c]pyridin-9-one (Example 4) according to the procedure of Example 11 gave a mixture which was chromatographed on silica gel (40 g. per g. of product mixture) that had been treated with isopropylamine (1 ml. per 4 g.) prior to packing. Elution of the column with 1:1 ether-pentane gave a 70% yield of (1R,3S,4aS,9aS)-1,2,3,4,-4a,9a-hexahydro-2-methyl-7-methoxy-9H-1,3-ethanoindeno[2,1-c]-pyridine [IA; R is CH₃, C=Z is CH₂, 7-OCH₃]; p-toluenesulfonate salt, m.p. 275°C (dec.) (colorless, thin plates from absolute ethanol), $[\alpha]_D^{25} = +49.2°$ (1% in H₂O). Further elution of the column with the same solvent mixture brought out a 20% yield of (1R,3S,4aS,9R,9aS)-1,2,3,4,4a,9a-hexahydro-2-methyl-7-methoxy-9H-1,3-ethanoindeno[2,1-c]pyridin-9β-ol [IA; R is CH₃, C=Z is CH(OH), 7-OCH₃]; hydrochloride salt, m.p. 275°C. (dec.) (from absolute ethanol), $[\alpha]_D^{25} = +26.9°$ (1% in H₂O).

EXAMPLE 16

Diborane reduction of (1R,3S,4aS,9aS)-1,2,3,4,4a,9a-hexahydro-2-methyl-6-methoxy-9H-1,3-ethanoindeno[2,1-c]pyridin-9-one (Example 5) according to the procedure of Example 11 gave as the sole product in 74% yield (1R,3S,4aS,9aS)-1,2,3,4,4a,9a-hexahydro-2-methyl-6-methoxy-9H-1,3-ethanoindeno[2,1-c]pyridine [IA; R is CH₃, C=Z is CH₂, 6-OCH₃]; sulfate salt, m.p. 195°-197°C. (dec.) (from acetonitrile), $[\alpha]_D^{21} = +93.7°$ (1% in H₂O).

EXAMPLE 17

Diborane reduction of (1R,3S,4aS,9aS)-1,2,3,4,4a,9a-hexahydro-2-methyl-8-methoxy-9H-1,3-ethanoindeno[2,1-c]pyridin-9-one (Example 5) according to the procedure of Example 11, gave a product which was chromatographed on silica gel (80 g. per g. product) using ether-pentane-isopropylamine(70:29:1) for elution. There was obtained in 86% yield (1R,3S,4aS,9aS)-1,2,3,4,4a,9a-hexahydro-2-methyl-8-methoxy-9H-1,3-ethanoindeno[2,1-c]pyridine [IA; R is CH₃, C=Z is CH₂, 8-OCH₃]; p-toluenesulfonate salt, m.p. 147.5°-151°C. (needles from absolute ethanol) and m.p. 133°-135°C. (massive prisms from water), $[\alpha]_D^{25} = +40.2°$ (1% in H₂O).

EXAMPLE 18

Reduction of IB (C=Z is C=O, R is CH₃) with Diborane

A solution of 30.0 g. (0.125 mol) of (1R,3S,4aR,10aR)-1,3,4,4a,5,10a-hexahydro-2-methyl-1,3-ethanobenz[g]isoquinolin-10(2H)-one in 500 ml. tetrahydrofuran was added dropwise with stirring to 750 ml. of 1M diborane in tetrahydrofuran under nitrogen at 5°-10°C. in 20 minutes. The solution was refluxed for 16 hours, quenched with 60 ml. water, treated with 300 ml. of 2N sodium hydroxide and refluxed for 2 hours. The tetrahydrofuran was boiled out on a steam bath, and the residual mixture was saturated with sodium chloride and extracted 3 times with ether. The extracts were concentrated to give a pasty residue which was triturated twice with pentane (150 ml.). The solid, 17.7 g. of m.p. 140°-145°C., was recrystallized from acetonitrile to give 11.2 g. of (1R,3S,4aR,10S,10aR)-1,2,3,4,4a,5,10,10a-octahydro-2-methyl-1,3-ethanobenz[g]isoquinolin-10α-ol [IB; C=Z is CH(OH-α), R is CH₃], prisms, m.p. 166°-168°C. (possible transformation at 128°-132°C.). Its hydrochloride salt was obtained in the form of prisms from ethanol, m.p. 328°C. (dec.), $[\alpha]_D^{25} = -37.6°$ (1% in H₂O).

The pentane triturate above, from which the latter product separated, contained 11.4 g. of an oily mixture of products. Column chromatography on 450 g. of silica gel using ether-pentane mixtures for elution failed to give separation. The 7.9 g. of oil recovered from the column was chromatographed on 24 prep silica plates (20 × 40-cm) (3:97 isopropylamine-ether) to give 3 major products.

The least polar band afforded 1.6 g. of (1R,3S,4aR,10aS)-1,2,3,4,4a,5,10,10a-octahydro-2-methyl-1,3-ethanobenz[g]isoquinoline [IB; C=Z is CH₂, R is CH₃, cis form], m.p. 83-85°C. Its hydrochloride salt was obtained in the form of needles from acetone, m.p. 294°-295°C. (dec.), $[\alpha]_D^{25} = +44.1°$ (1% in H₂O).

The band of intermediate polarity furnished 2.1 g. of benz[g]isoquinolin-10β-ol [IB; C=Z is CH(OH-β), R is CH₃], m.p. 138°-145°C. One recrystallization from hexane gave a sample with m.p. 149°-151°C. (prisms from hexane); $[\alpha]_D^{25} = -39.5°$ (1% in CHCl₃).

The most polar band (2.1 g. of oil) had to be rechromatographed on 8 prep plates using 3 passes of the same solvent system. Thus was obtained 1.8 g. of (1R,3S,4aR,10aR)-1,2,3,4,4a,5,10,10a-octahydro-2-methyl-1,3-ethanobenz[g]isoquinoline [IB; C=Z is CH₂, R is CH₃, trans form] which formed a crystalline hydrochloride salt, m.p. 302°-303°C. (dec.) (prisms from ethanol); $[\alpha]_D^{25} = +42.0°$ (1% in H₂O).

The configurations of the cis and trans bases [IB; C=Z is CH₂, R is CH₃] were assigned from the fact that the cis base only produced a 1% yield of quaternary salt with ethyl iodide, whereas the trans base gave 41% of quaternary salt.

By analogous procedures (1R,3S,4aR,10aR)-1,3,4,4a,5,10a-hexahydro-2-methyl-8-fluoro-1,3-ethanobenz[g]isoquinolin-10(2H)-one, (1R,3S,4aR,10aR)-1,3,4,4a,5,10a-hexahydro-2-methyl-8-chloro-1,3-ethanobenz[g]isoquinolin-10(2H)-one, (1R,3S,4aR,10aR)-1,3,4,4a,5,10a-hexahydro-2-methyl-8-methoxy-1,3-ethanobenz[g]-isoquinolin-10(2H)-one or (1R,3S,4aR,10aR)-1,3,4,4a,5,10a-hexahydro-2,8-dimethyl-1,3-ethanobenz[g]isoquinolin-10(2H)-one can be reduced with diborane to produce mixtures of the corresponding 9-ol and 9-deoxy compounds.

EXAMPLE 19

(1R,3S,4aS,9aS)-1,2,3,4,4a,9a-Hexahydro2-methyl-9H-1,3-ethanoindeno[2,1-c]pyridin-6-ol [IA; R is CH₃, C=Z is CH₂, 6-OH]

The sulfate salt of (1R,3S,4aS,9aS)-1,2,3,4,4a,9a-hexahydro-2-methyl-6-methoxy-9H-1,3-ethanoindeno[2,1-c]pyridine (Example 16) was heated under reflux for 145 minutes with 48% aqueous hydrogen bromide (5 ml. per g.), and the solution was cooled and brought to pH 8 with concentrated ammonium hydroxide to give in 81% yield the hydrobromide salt of (1R,3S,4aS,9aS)-1,2,3,4,4a,9a-hexahydro-2-methyl-9H-1,3-ethanoindeno[2,1-c]-pyridin-6-ol, m.p. 298°-299°C., $[\alpha]_D^{25} = +94.9°$ (1% in H₂O).

Similarly, (1R,3S,4aR,10aR)-1,3,4,4a,5,10a-hexahydro-2-methyl-8-methoxy-1,3-ethanobenz[g]isoquinoline can be demethylated to produce (1R,3S,4aR,10aR)-1,3,4,4a,5,10a-hexahydro-2-methyl-1,3-ethanobenz[g]isoquinolin-8-ol [IB; R is CH₃, C=Z is CH₂, 8-OH].

EXAMPLE 20

Ethyl (1R,3S,4aS,9aS)-1,2,3,4,4a,9a-hexahydro-9H-1,3-ethanoindeno[2,1-c]pyridine-2-carboxylate [IA; R is $C_2H_5OCO$, C=Z is $CH_2$]

A mixture of 0.1 mol of (1R,3S,4aS,9aS)-1,2,3,4,4a,9a-hexahydro-2-methyl-9H-1,3-ethanoindeno[2,1-c]pyridine (Example 7) and 0.2 mol of ethyl chloroformate was warmed on a steam bath until evolution of methyl chloride ceased. An additional 0.2 mol of ethyl chloroformate was added and the mixture was heated under reflux for 4 hours. The mixture was cooled, diluted with ether, washed with 2N hydrochloric acid, concentrated, and distilled to give in 77.5% yield ethyl (1R,3S,4aS,9aS)-1,2,3,4,4a,9a-hexahydro-9H-1,3-ethanoindeno[2,1-c]pyridine-2-carboxylate, b.p. 152–160°C. (0.7 mm.), $n_D^{25} = 1.5491$, which crystallized and melted at 88°–90°C. (from pentane).

By an analogous procedure (1R,3S,4aR,10aS)-1,2,3,4,4a-5,10,10a-octahydro-2-methyl-1,3-ethanobenz[g]isoquinoline (Example 18) can be converted to ethyl (1R,3S,4aR,10aS)-1,2,3,4,4a,5,10,10a-octahydro-2-methyl-1,3-ethanobenz[g]isoquinoline-2-carboxylate [IB; R is $C_2H_5OCO$, C=Z is $CH_2$].

EXAMPLE 21

(1R,3S,4aS,9aS)-1,2,3,4,4a,9a-Hexahydro-9H-1,3-ethanoindeno-[2,1-c]pyridine [IA; R is H, C=Z is $CH_2$]

A mixture of ethyl (1R,3S,4aS,9aS)-1,2,3,4,4a,9a-hexahydro-9H-1,3-ethanoindeno[2,1-c]pyridine-2-carboxylate (Example 20) and 6N hydrochloric acid (20 ml. per g.) was heated under reflux for 48 hours. 1-Propyl alcohol (8 ml. per g.) was added and reflux continued for 24 hours. Ether was added and the product extracted with 2N hydrochloric acid. The acidic extracts afforded in 80% yield the hydrochloride salt of (1R,3S,4aS,9aS)-1,2,3,4,4a,9a-hexahydro-9H-1,3-ethanoindeno[2,1-c]pyridine, m.p. 303°C. (dec.) (from acetonitrile), $[\alpha]_D^{25} = +88.0°$ (1% in $H_2O$).

By an analogous procedure, ethyl (1R,3S,4aR,10aS)-1,2,3,4,4a,5,10,10a-octahydro-2-methyl-1,3-ethanobenz[g]isoquinoline-2-carboxylate can be converted to (1R,3S,4aR,10aS)-1,2,3,4,4a,10,10a-octahydro-1,3-ethanobenz[g]isoquinoline [IB; R is H, C=Z is $CH_2$].

EXAMPLE 22

(1R,3S,4aS,9aS)-2-Cyclopropylcarbonyl-1,2,3,4,4a,9a-hexahydro-9H-1,3-ethanoindeno[2,1-c]pyridine [IA; R is cyclopropyl-CO, C=Z is $CH_2$]

Cyclopropanecarboxylic acid chloride (5.25 g., 0.050 mol) was added dropwise to 10.0 g. (0.050 mol) of (1R,3S,4aS,9aS)-1,2,3,4,4a,9a-hexahydro-9H-1,3-ethanoindeno[2,1-c]pyridine (Example 21) in 100 ml. of chloroform containing 5.1 g. (0.050 mol) of triethylamine. The mixture was heated under reflux for 15 minutes, cooled, and washed with 2N sodium hydroxide, 2N hydrochloric acid and brine. The extracts were dried over anhydrous sodium sulfate and concentrated to give (1R,3S,4aS,9aS)-2-cyclopropylcarbonyl-1,2,3,4,4a,9a-hexahydro-9H-1,3-ethanoindeno[2,1-c]pyridine, used directly in Example 23 without further purification.

By an analogous procedure (1R,3S,4aR,10aS)-1,2,3,4,4a,-5,10,10a-octahydro-1,3-ethanobenz[g]isoquinoline can be converted to (1R,3S,4aR,10aS)-2-cyclopropylcarbonyl-1,2,3,4,4a,5,10,10a-octahydro-1,3-ethanobenz[g]isoquinoline [IB; R is cyclopropyl-CO, C=Z is $CH_2$].

EXAMPLE 23

(1R,3S,4aS,9aS)-2-Cyclopropylmethyl-1,2,3,4,4a,9a-hexahydro-9H-1,3-ethanoindeno[2,1-c]pyridine [IA; R is cyclopropyl-$CH_2$, C=Z is $CH_2$]

The total crude product from Example 22 was dissolved in 100 ml. of tetrahydrofuran and added to 5 g. of lithium aluminum hydride in 400 ml. of tetrahydrofuran. The mixture was heated under reflux for 5 hours, quenched with 10 ml. of water and filtered. The filtrate was concentrated and the free base product converted to the hydrochloride salt of (1R,3S,4aS,9aS)-2-cyclopropylmethyl-1,2,3,4,4a,9a-hexahydro-9H-1,3-ethanoindeno-[2,1-c]pyridine, colorless needles, m.p. 239-240°C., $[\alpha]_D^{25} = +85.6°$ (1% in $H_2O$) (95 percent yield).

By an analogous procedure, (1R,3S,4aR,10aS)-2-cyclopropylcarbonyl-1,2,3,4,4a,5,10,10a-octahydro-1,3-ethanobenz[g]-isoquinoline can be converted to (1R,3S,4aR,10aS)-2-cyclopropylmethyl-1,2,3,4,4a,5,10,10a-octahydro-1,3-ethanobenz[g]isoquinoline [IB; R is cyclopropyl-$CH_2$, C=Z is $CH_2$].

EXAMPLE 24

(1R,3S,4aS,9aS)-2-Benzyl-1,2,3,4,4a,9a-hexahydro-9H-1,3-ethanoindeno[2,1-c]pyridine [IA; R is $C_6H_5CH_2$, C=Z is $CH_2$] was prepared by reacting (1R,3S,4aS,9aS)-1,2,3,4,4a,9a-hexahydro-9H-1,3-ethanoindeno[2,1-c]pyridine (Example 21) with benzoyl chloride and reducing the resulting N-benzoyl compound with lithium aluminum hydride according to the procedures of Examples 22 and 23. The product was obtained in the form of its p-toluenesulfonate salt, m.p. 206-207°C. and 217-219°C., $[\alpha]_D^{25} = +98.0°$ (1% in ethanol).

By an analogous procedure, (1R,3S,4aR,10aS)-1,2,3,4,-4a,5,10,10a-octahydro-1,3-ethanobenz[g]isoquinoline can be converted to (1R,3S,4aR,10aS)-2-benzyl-1,2,3,4,4a,5,10,10a-octahydro-1,3-ethanobenz[g]isoquinoline [IB; R is $C_6H_5CH_2$, C=Z is $CH_2$].

EXAMPLE 25

(1R,3S,4aS,9aS)-1,2,3,4,4a,9a-Hexahydro-2-hydroxyethyl-9H-1,3-ethanoindeno[2,1-c]pyridine [IA; R is $HOCH_2CH_2$, C=Z is $CH_2$]

A mixture of 9.63 g. (0.043 mol) of (1R,3S,4aS,9aS)-1,2,3,4,4a,9a-hexahydro-9H-1,3-ethanoindeno[2,1-c]pyridine (Example 21), 6.96 g. (0.082 mol) of sodium bicarbonate, 7.1 g. (0.047 mol) of ethylene bromohydrin and 50 ml. of methanol was stirred at room temperature for 96 hours. Ether was added, the mixture was filtered and the filtrate washed with brine, dried over anhydrous sodium sulfate and concentrated to give 7.2 g. of (1R,3S,4aS,9aS)-1,2,3,4,4a,9a-hexahydro-2-hydroxyethyl-9H-1,3-ethanoindeno[2,1-c]pyridine; hydrochloride salt, colorless needles, m.p. 230°-232°C., $[\alpha]_D^{25} = +81.4°$ (1% in $H_2O$).

By an analogous procedure, (1R,3S,4aR,10aS)-1,2,3,4,4a,-5,10,10a-octahydro-1,3-ethanobenz[g]isoquinoline can be converted to (1R,3-

S,4aR,10aS)-2-hydroxyethyl-1,2,3,4,4a,5,10,10a-octahydro-1,3-ethanobenz[g]isoquinoline [IB; R is HOCH₂CH₂, C=Z is CH₂].

EXAMPLE 26

(1R,3S)-1,2,3,4-Tetrahydro-2-methyl-9H-1,3-ethanoindeno[2,1-c]-pyridine

A mixture of 26.4 g. (0.12 mol) of (1R,3S,4aS,9aS,9-R)-1,2,3,4,4a,9a-hexahydro-2-methyl-9H-1,3-ethanoindeno[2,1-c]-pyridin-9β-ol and 150 ml. of phosphorus oxychloride was heated at reflux for 3 hours. The excess reagent was removed by heating the mixture in vacuo. The oily residue containing the delta-9,9a compound was dissolved in methanol and treated with 2.5 g. of sodium methoxide. The mixture was heated under reflux for 1.5 hours and filtered free of sodium chloride. The filtrate was diluted with ether, washed with saturated sodium chloride, dried over anhydrous sodium sulfate and concentrated to give 20.0 g. of product. Distillation at 112°–116°C. (0.5-0.6 mm.) yielded 18.0 g. (74%) of (1R,3S)-1,2,3,4-tetrahydro-2-methyl-9H-1,3-ethanoindeno-[2,1-c]pyridine; hydrochloride salt, m.p. 268°–270°C. (from acetone); $[\alpha]_D^{25} = +80.7°$ (1 % in H₂O).

EXAMPLE 27

(1R,3S,4aR,9aR)-1,2,3,4,4a,9a-Hexahydro-2-methyl-9H-1,3-ethanoindeno[2,1-c]pyridine [IA; R is CH₃, C=Z is CH₂, cis-anti configuration]

A solution of 5.0 g. (0.02 mol) of the hydrochloride salt of (1R,3S)-1,2,3,4-tetrahydro-2-methyl-9H-1,3-ethanoindeno-[2,1-c]pyridine (Example 26) in 300 ml. of 95% ethanol was hydrogenated at 3.5 kg/cm² in the presence of 0.5 g. of 10% palladium-on-carbon catalyst. When one mol of H₂O was absorbed, the catalyst and solvent were removed. The crystalline residue (5.0 g.) was recrystallized from acetone to give 4.0 g. (80%) of (1R,3S,4aR,9aR)-1,2,3,4,4a9a-hexahydro-2-methyl-9H-1,3-ethanoindeno[2,1-c]pyridine in the form of its hydrochloride salt, m.p. 306°C. (dec.); $[\alpha]_D^{25} = -27.9°$ (1% in H₂O).

Similar hydrogenation of the isomeric delta-9,9a compound prior to its rearrangement with base afforded (1R,3S,4aS,9aS)-1,2,3,4,4a,9a-hexahydro-2-methyl-9H-1,3-ethanoindeno[2,1-c]pyridine having the cis-syn configuration, identical with the compound obtained in Example 11(a).

The cis-anti isomer readily formed an ethiodide quaternary salt whereas the cis-syn isomer did not react with ethyl iodide.

We claim:

1. A compound selected from the group consisting of (A) a compound of the formula

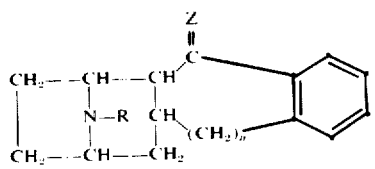

wherein:

R is hydrogen, lower-alkyl, lower-alkanoyl, lower-alkoxycarbonyl, cycloalkylcarbonyl, cycloalkyl-lower-alkyl, phenyllower-alkyl or hydroxy-lower-alkyl, cycloalkyl, each instance, having from three to six ring members and a total carbon content of from three to ten carbon atoms;

C=Z is C=O, CH₂, CH(OH) or CH(O-lower-alkanoyl);

n is 0 or 1;

and the phenyl ring is unsubstituted or substituted by from one to two substituents selected from the group consisting of lower-alkyl, lower-alkoxy, fluoro, chloro and hydroxy; and (B) a medicinally acceptable acid-addition salt of a compound under (A) above.

2. A compound according to claim 1 wherein R is methyl, C=Z is C=O and n is 0.

3. 1,2,3,4,4a,9a-Hexahydro-2-methyl-9H-1,3-ethanoindeno[2,1c]pyridin-9-one, according to claim 2.

4. 1,2,3,4,4a,9a-Hexahydro-2-methyl-6-methoxy-9H-1,3-ethanoindeno[2,1-c]pyridin-9-one according to claim 2.

5. 1,2,3,4,4a,9a-Hexahydro-2-methyl-7-fluoro-9H-1,3-ethanoindeno[2,1-c]pyridin-9-one, according to claim 2.

6. 1,2,3,4,4a,9a-Hexahydro-2-methyl-8-methoxy-9H-1,3-ethanoindeno[2,1-c]pyridin-9-one, according to claim 2.

7. A compound according to claim 1 wherein R is methyl, C=Z is CH(OH) and n is 0.

8. 1,2,3,4,4a,9a-Hexahydro2-methyl-9H-1,3-ethanoindeno[2,1-c]pyridin-9-ol, according to claim 7.

9. 1,2,3,4,4a,9a-Hexahydro-2-methyl-7-fluoro-9H-1,3-ethanoindeno[2,1-c]pyridin-9-ol, according to claim 7.

10. 1,2,3,4,4a,9a-Hexahydro-2-methyl-7-methoxy-9H-1,3-ethanoindeno[2,1-c]pyridin-9-ol, according to claim 7.

11. A compound according to claim 1 wherein R is methyl, C=Z is CH(O-lower-alkanoyl) and n is 0.

12. 1,2,3,4,4a,9a-Hexahydro-2-methyl-9H-1,3-ethanoindeno[2,1-c]pyridin-9-ol acetate, according to claim 11.

13. 1,2,3,4,4a,9a-Hexahydro-2-methyl-7-fluoro-9H-1,3-ethanoindeno[2,1-c]pyridin-9-ol acetate, according to claim 11.

14. A compound according to claim 1 wherein R is methyl, C=Z is CH₂ and n is 0.

15. 1,2,3,4,4a,9a-Hexahydro-2-methyl-9H-1,3-ethanoindeno[2,1-c]pyridine, according to claim 14.

16. 1,2,3,4,4a,9a-Hexahydro-2-methyl-6-methoxy-9H-1,3-ethanoindeno[2,1-c]pyridine, according to claim 14.

17. 1,2,3,4,4a,9a-Hexahydro-2-methyl-6-hydroxy-9H-1,3-ethanoindeno[2,1-c]pyridine, according to claim 14.

18. 1,2,3,4,4a,9a-Hexahydro-2-methyl-7-fluoro-9H-1,3-ethanoindeno[2,1-c]pyridine, according to claim 14.

19. 1,2,3,4,4a,9a-Hexahydro-2-methyl-8-methoxy-9H-1,3-ethanoindeno[2,1-c]pyridine, according to claim 14.

20. 1,2,3,4,4a,9a-Hexahydro-2-methyl-7-methoxy-9H1,3-ethanoindeno[2,1-c]pyridine, according to claim 14.

21. 1,2,3,4,4a,9a-Hexahydro-9H-1,3-ethanoindeno[2,1-c]-pyridine, according to claim 1.

22. 1,2,3,4,4a,9a-Hexahydro-2-cyclopropylmethyl-9H-1,3-ethanoindeno[2,1-c]pyridine, according to claim 1.

23. 1,2,3,4,4a,9a-Hexahydro-2-(2-hydroxyethyl)-9H-1,3-ethanoindeno[2,1-c]pyridine, according to claim 1.

24. 1,2,3,4,4a,9a-Hexahydro-2-benzyl-9H-1,3-ethanoindeno[2,1-c]pyridine, according to claim 1.

25. 1,2,3,4,4a,9a-Hexahydro-2-carbethoxy-9H-1,3-ethanoindeno[2,1-c]pyridine, according to claim 1.

26. 1,2,3,4-Tetrahydro-2-methyl-9H-1,3-ethanoindeno-[2,1-c]pyridine.

27. A compound according to claim 1 in which R is methyl and $n$ is 1.

28. 1,3,4,4a,5,10a-Hexahydro-2-methyl-1,3-ethanobenz[g]isoquinolin-10(2H)-one, according to claim 27.

29. 1,2,3,4,4a,10,10a-Octahydro-2-methyl-1,3-ethanobenz[g]isoquinoline, according to claim 27.

30. 1,2,3,4,4a,5,10,10a-Octahydro-2-methyl-1,3-ethanobenz[g]isoquinolin-10-ol, according to claim 27.

* * * * *

UNITED STATES PATENT OFFICE
CERTIFICATE OF CORRECTION

PATENT NO. : 3,901,892

DATED : August 26, 1975

INVENTOR(S) : Robert L. Clarke and Sol J. Daum

It is certified that error appears in the above-identified patent and that said Letters Patent are hereby corrected as shown below:

Column 2, line 21, "lower-alkoxy" should read --lower-alkanoyl--.

Column 20, line 5, Claim 29, "1,2,3,4,4a,10,10a" should read --1,2,3,4,4a,5,10,10a--.

Signed and Sealed this eighteenth Day of November 1975

[SEAL]

Attest:

RUTH C. MASON
Attesting Officer

C. MARSHALL DANN
Commissioner of Patents and Trademarks